July 6, 1926.
H. H. ASKEW
DIRT COLLECTOR
Filed Dec. 20, 1923
1,591,262
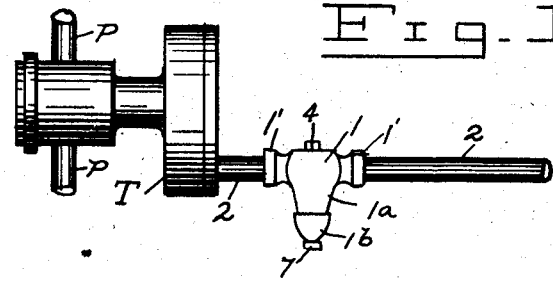
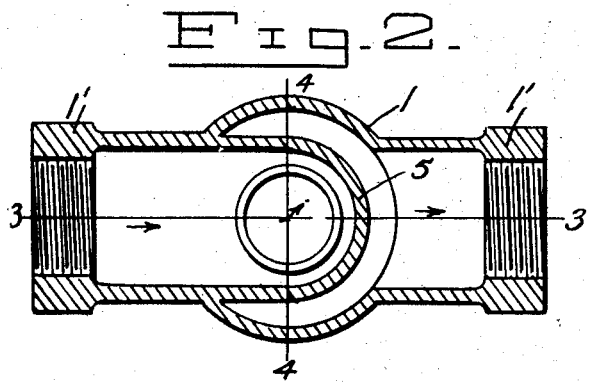
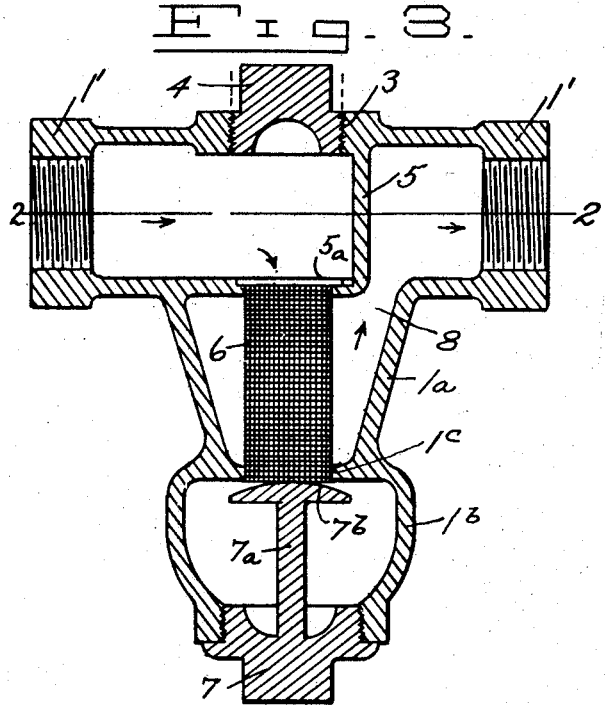
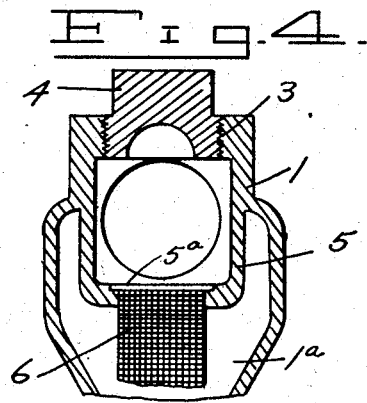
INVENTOR.
Harvey H. Askew
BY
ATTORNEY.

Patented July 6, 1926.

1,591,262

UNITED STATES PATENT OFFICE.

HARVEY H. ASKEW, OF SAN BERNARDINO, CALIFORNIA.

DIRT COLLECTOR.

Application filed December 20, 1923. Serial No. 681,714.

My invention relates to dirt collectors and more particularly to a simple and practical device adapted to be connected into an air or gas line for the purpose of eliminating dirt, gravel and other solid matter from the air or gas as it passes through said device. My device is more especially designed to be connected into the air line of an air brake system for the purpose of intercepting the dirt, gravel and fine solid matters which would injure the mechanism of the brake controlling valves, or the triple valve near which it is frequently placed in the air brake system.

The principal object of my invention is to provide a simple, practical and economical device of the character referred to which is easily installed and which has no complicated parts to get out of order, and which can be easily taken apart for inspection, cleaning or replacements.

In order to explain my invention, I have illustrated one practical embodiment thereof on the accompanying sheet of drawings which I will now describe.

Figure 1 is a side elevation of a triple valve showing my invention connected into a pipe line running thereto;

Figure 2 is a horizontal sectional view of my device, taken on line 2—2 of Fig. 3;

Figure 3 is a vertical sectional view of my device on line 3—3 of Fig. 2; and

Figure 4 is a cross sectional view on line 4—4 of Fig. 2.

Referring in detail to the drawings, the invention as here illustrated for purposes of description comprises a body 1, somewhat of general T-shape, with connecting means, as at 1', 1', for connection with a pipe line, 2, as indicated in Fig. 1. In the top is an opening, 3, with plug, or closure member, 4. Within the body is an angular partition member 5, with opening in the bottom thereof, designated 5$^a$, within which is suspended or supported a cylindrical screen member 6, clearly indicated in Fig. 3. The lower portion of the body is shown of tapering form, as 1$^a$, with an enlarged bottom part 1$^b$, having a closure plug, 7, said closure member 7, having a stem-like part, 7$^a$, extending inwardly and provided at its inner end with a rounded head, 7$^b$, substantially as indicated in Fig. 3. The rounded or convexed part of said head, 7$^b$, underlies the lower end of the screen element 6, which is held in place in the partition 1$^c$, as indicated. In the tapered portion 1$^a$ of said body, around said screen 6, is an annular air space which communicates through the space, as at 8, with the right hand side of the body, Fig. 3, as indicated by the arrows. Thus air or gas enters at the left side of the device, as shown in Fig. 3, and passes downwardly through the cylindrical screen element, 6, and thence through the side of the screen element 6 and upwardly and out at the right hand side of said device, Fig. 3. It is necessary therefore, for the air to pass downwardly into and through the cylindrical screen in the showing here made, and the action is that the solid fine matter, such as dust and gravel, being thrown or discharged downwardly with the air into the screen member, will, with the force of the momentum and gravity together, be carried on downwardly and out at the lower end of the cylindrical screen element 6, while the air will pass through the screen mesh and upwardly and out the other side of the device, the screen also serving to screen the dirt and fine solid matter from the air as it passes therethrough, and this dirt and solid matter drops downwardly over the convexed upper side of the head, 7$^b$, of the member 7, as clearly illustrated, and into the receiving part, 1$^b$, of the lower part of the body.

In Fig. 1, the device is connected in a pipe line 2, 2, which connects with a triple valve mechanism, T, which controls the main pipe line, P.

An important feature in my invention is the fact that it can be used in place of an elbow in some places. This is accomplished, where it is necessary to connect the device in a pipe line at a turn or where there is an elbow, by removing the plug, 4, and inserting it into the left hand end of the member 1' and then connecting one end of the pipe line into the opening 3, and the other end of the pipe line into the right hand end of said member 1'. To this end these openings and plugs are of standard size, thus facilitating the connection of the device into a pipe line where it is to be used.

I do not limit my invention to the details shown in the drawings for purposes of description, except as I may be limited by the hereto appended claims.

I claim:—

1. A dirt collector of the character shown comprising a body member having an inlet and an outlet opening in horizontal alinement with each other, an opening with closure in the top of said body, a wall from said inlet opening forming a separate chamber to and including said top opening, an opening downwardly through the bottom of said wall and directly below said opening in the top of said body, a tubular screen in said bottom opening and extending therefrom down into said body, said body having a chamber surrounding said screen and in open communication with the outlet opening from said body, said body having a chamber formed below said screen with a restricted opening to hold the lower end of said screen above said chamber, and a closure plug for said last mentioned chamber below said screen and having a support attached thereto for said screen.

2. A dirt collector of the character referred to comprising a body having an inlet and an outlet opening, a wall from said inlet opening forming a separate chamber to and around the central part of said body and separating said inlet opening from said outlet opening, said wall having an opening downwardly therethrough, a tubular screen in said last opening and extending downwardly at right angles to the direction of the inlet opening below said wall and being in communication with said outlet opening in said body, and a closure plug at the lower end of said tubular screen and in alinement therewith, whereby when said closure plug is removed said tubular screen is in open alinement with said opening, said closure plug opening being larger than said screen, substantially as indicated.

Signed at Los Angeles, Los Angeles County, California, this 8th day of December, 1923.

HARVEY H. ASKEW.